US008990358B2

(12) United States Patent
Sharp

(10) Patent No.: US 8,990,358 B2
(45) Date of Patent: Mar. 24, 2015

(54) SYSTEMS AND METHODS FOR EXPEDITED DELIVERY OF MEDIA CONTENT

(71) Applicant: Michael Sharp, Porter, TX (US)

(72) Inventor: Michael Sharp, Porter, TX (US)

(*) Notice: Subject to any disclaimer, the term of this patent is extended or adjusted under 35 U.S.C. 154(b) by 0 days.

(21) Appl. No.: 14/173,635

(22) Filed: Feb. 5, 2014

(65) Prior Publication Data

US 2014/0280773 A1  Sep. 18, 2014

Related U.S. Application Data

(60) Provisional application No. 61/798,258, filed on Mar. 15, 2013.

(51) Int. Cl.
*G06Q 30/02* (2012.01)
*G06F 15/16* (2006.01)
*H04L 29/06* (2006.01)
*G07G 1/14* (2006.01)

(52) U.S. Cl.
CPC ................... *H04L 65/4084* (2013.01)
USPC ........... 709/219; 709/217; 709/218; 709/231; 705/14.4; 705/14.69; 705/14.73

(58) Field of Classification Search
CPC .............. G06Q 30/0241; G06Q 30/02; G06Q 30/0277; G06Q 30/0257; H04N 21/812; H04N 21/8113; H04N 21/8173; H04N 21/23424; H04L 65/0484
USPC ........... 705/14.4, 14.69–14.73; 709/217–219, 709/231
See application file for complete search history.

(56) References Cited

U.S. PATENT DOCUMENTS

| | | | |
|---|---|---|---|
| 8,630,894 B2* | 1/2014 | Robinson et al. ................ 705/12 |
| 8,671,000 B2* | 3/2014 | Aaltonen ........................... 705/4 |
| 2002/0077987 A1* | 6/2002 | Hasegawa ........................ 705/52 |
| 2005/0080878 A1* | 4/2005 | Cunningham et al. ........ 709/219 |
| 2005/0119936 A1* | 6/2005 | Buchanan et al. .............. 705/14 |
| 2005/0125354 A1* | 6/2005 | Pisaris-Henderson et al. . 705/52 |
| 2007/0162335 A1* | 7/2007 | Mekikian ......................... 705/14 |
| 2007/0204308 A1* | 8/2007 | Nicholas et al. ................ 725/86 |
| 2008/0250120 A1* | 10/2008 | Mick et al. .................... 709/219 |
| 2008/0256567 A1* | 10/2008 | Butler ............................... 725/2 |
| 2009/0099911 A1* | 4/2009 | Ota ................................. 705/14 |
| 2009/0182621 A1* | 7/2009 | McCourt ......................... 705/10 |
| 2009/0276313 A1* | 11/2009 | Wilhelm .................... 705/14.53 |
| 2009/0300145 A1* | 12/2009 | Musayev et al. .............. 709/219 |
| 2010/0161825 A1* | 6/2010 | Ronca et al. .................. 709/231 |
| 2011/0295667 A1* | 12/2011 | Butler ....................... 705/14.12 |

(Continued)

*Primary Examiner* — Alina N Boutah
(74) *Attorney, Agent, or Firm* — Klarquist Sparkman, LLP

(57) ABSTRACT

The systems and methods disclosed herein are directed to making multimedia content available over a network to users on-demand. In one representative embodiment, a method of providing sponsored downloads of multimedia content to a user on-demand comprises receiving a request to sponsor one or more downloads of one or more multimedia files by one or more users. The request can originate from a sponsoring entity, and the one or more multimedia files can be available through a multimedia provider service. The method can further comprise receiving a request originating from a multimedia player to download a multimedia file from the multimedia provider service, and transmitting the multimedia file to the multimedia player. The multimedia file can be transmitted to the multimedia player with a commercial message from the sponsoring entity.

10 Claims, 13 Drawing Sheets

(56) References Cited

U.S. PATENT DOCUMENTS

| | | | |
|---|---|---|---|
| 2012/0174152 A1* | 7/2012 | Ye et al. | 725/36 |
| 2013/0219524 A1* | 8/2013 | Sidi | 726/30 |
| 2013/0238418 A1* | 9/2013 | Malca et al. | 705/14.41 |
| 2013/0246311 A1* | 9/2013 | Lee et al. | 705/400 |
| 2013/0325594 A1* | 12/2013 | Mehta | 705/14.46 |
| 2014/0012806 A1* | 1/2014 | Ching et al. | 707/609 |
| 2014/0047005 A1* | 2/2014 | Radar | 709/203 |
| 2014/0081748 A1* | 3/2014 | Abuelsaad et al. | 705/14.53 |

* cited by examiner

FIG. 13

FIG. 14

SYSTEMS AND METHODS FOR EXPEDITED DELIVERY OF MEDIA CONTENT

CROSS REFERENCE TO RELATED APPLICATION

This application claims the benefit of U.S. Provisional Application No. 61/798,258 filed Mar. 15, 2013, which is herein incorporated by reference in its entirety.

FIELD

This disclosure is related to systems and methods of making multimedia content available over a network to users on-demand.

BACKGROUND

Traditionally, multimedia files are downloaded from the Internet for a fee from online multimedia distributor services such as iTunes. The downloaded multimedia files can then be played back by multimedia players on any of various electronic devices, including mobile phones, personal computers, laptops, tablets, portable music players, etc. However, users frequently do not want to pay or cannot afford to pay to download multimedia content and, in some cases, resort to illegal downloading of copyrighted material. Accordingly, improvements to multimedia files and methods of playback are desirable.

SUMMARY

The systems and methods disclosed herein are directed to making multimedia content available over a network to users on-demand. In one representative embodiment, a method of providing sponsored downloads of multimedia content to a user on-demand comprises receiving a request to sponsor one or more downloads of one or more multimedia files by one or more users. The request can originate from a sponsoring entity, and the one or more multimedia files can be available through a multimedia provider service. The method can further comprise receiving a request originating from a multimedia player to download a multimedia file from the multimedia provider service, and transmitting the multimedia file to the multimedia player. The multimedia file can be transmitted to the multimedia player with a commercial message from the sponsoring entity.

In another representative embodiment, a system for providing a download of a multimedia file to a user on-demand can comprise a multimedia player configured to play multimedia files and a multimedia provider service in communication with the multimedia player over a network. The multimedia provider service can include a multimedia content server with a database containing multimedia files, and can be configured to stream multimedia files to the multimedia player over the network. The multimedia provider service can be configured to receive a request from the multimedia player to download a multimedia file currently being streamed to the multimedia player, where the request is sent upon activation of a download button associated with the multimedia player. The multimedia provider service can be configured to transmit a copy of the multimedia file to the multimedia player in response to the request.

The foregoing and other objects, features, and advantages of the invention will become more apparent from the following detailed description, which proceeds with reference to the accompanying figures.

BRIEF DESCRIPTION OF THE DRAWINGS

FIG. 13 is an exemplary embodiment of an advertiser administrator page of the multimedia provider service.

FIG. 14 is another view of the advertiser administrator page of the multimedia provider service.

DETAILED DESCRIPTION

General Considerations

Figure 1:
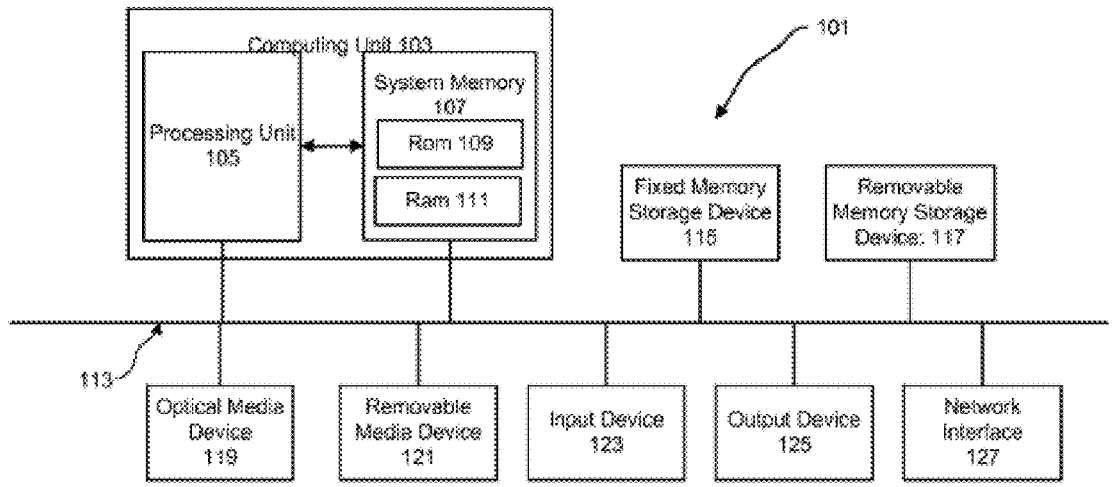
FIG. 1 is a schematic representation of a computing environment in which certain embodiments of the systems and methods disclosed herein can be implemented.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level abstractions of the actual operations that are performed. The actual operations that correspond to these terms may vary depending on the particular implementation and are readily discernible by one of ordinary skill in the art.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C."

Illustrative Operating Environment

Various systems for providing supplemental data to users during file transfer actions are described below. In some embodiments, these systems—including the transfer of files and the associated supplemental data—may be implemented or performed, at least in part, by software stored on one or more tangible computer-readable media (e.g., one or more optical media discs, volatile memory or storage components (such as DRAM or SRAM), or nonvolatile memory or storage components (such as hard drives)) and executed on one or more computing systems. Some basic background information relating to computing systems capable of transferring files as discussed above are provided.

The computing systems can include one or more central processing units (CPUs) and a memory, such as random access memory (RAM) for temporary storage of information and/or a read only memory (ROM) for permanent storage of information, and a mass storage device, such as a hard drive, diskette, or optical media storage device. Typically, the modules of the computing system are connected to the computer using a standards-based bus system, such as, for example, Peripheral Component Interconnect (PCI), Microchannel, SCSI, Industrial Standard Architecture (ISA) and Extended ISA (EISA) architectures. The computing system may also include one or more commonly available input/output (I/O) devices and interfaces, such as a keyboard, a mouse, and/or a touchpad. In one embodiment, the I/O devices and interfaces include one or more display devices, such as a monitor, that allows the visual presentation of data to a user. More particularly, a display device provides for the presentation of Graphical User Interfaces (GUIs), application software data, and multimedia presentations, for example. The computing system may also provide a communications interface to various external devices.

Such software can be executed on a single computer or on a networked computer (e.g., via the Internet, a wide-area network, a local-area network, a client-server network, or other such network). The systems and methods disclosed herein can also be performed using cloud computing, a form of Internet-based computing, whereby shared resources, software and information are provided to computers and other devices on-demand. The software embodiments disclosed herein can be described in the general context of computer-executable instructions, such as those included in program modules, which can be executed in a computing environment on a target real or virtual processor. The computing system may run on a variety of computing devices, such as, for example, a server, a Windows server, a Structure Query Language server, a Unix server, a personal computer, a mainframe computer, a laptop computer, a cell phone, a personal digital assistant, a kiosk, a multimedia player, and so forth. The computing system is generally controlled and coordinated by operating system software. Conventional operating systems control and schedule computer processes for execution, perform memory management, provide file system, networking, and I/O services, and provide a user interface, such as a graphical user interface, among other things.

Furthermore, any of the software embodiments (comprising, for example, computer-executable instructions for causing a computer to perform any of the disclosed methods) can be transmitted, received, or accessed through a suitable communication means. Similarly, any data structure, data file, intermediate result, or final result created or modified using any of the disclosed methods can be transmitted, received, or accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means now known or unknown. Moreover, any data structure, data file, intermediate result, or final result produced by any of the disclosed methods can be displayed to a user using a suitable display device (e.g., a computer monitor or display). Such displaying can be performed as part of a computer-implemented method of performing any of the disclosed methods. As the techniques of the disclosed technology may be implemented using a programmable computer system executing software instructions, the components and operation of a computer system on which various implementations of the disclosed technology may be employed is described.

Accordingly, FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be a microprocessor. The system memory 107 may include a read-only memory ("ROM") 109 and/or a random access memory ("RAM") 111. As will be appreciated by those of ordinary skill in the art, either or both of the ROM 109 or the RAM 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices, such as: a fixed memory storage device 115, for example, a magnetic disk drive; a removable memory storage device 117, for example, a removable solid state disk drive; an optical media device 119, for example, a digital video disk drive; or a removable media device 121, for example, a removable drive. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus ("USB") connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol ("TCP") and the Internet protocol ("IP"). Also, the interface 127 may employ any suitable connection agent (or combination of agents) for connecting to a network, including, for example, a wireless transceiver, a modem, or an Ethernet connection.

It should be appreciated that the computing device 101 is shown here for illustrative purposes only, and it is not intended to be limiting. Various embodiments of the invention may be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, a mobile computing device such as a smartphone, tablet, or portable multimedia player, or any combination thereof.

As stated above, various embodiments of the invention may be implemented using a programmable computer system executing software instructions, a computer readable medium having computer-executable software instructions stored thereon, or some combination thereof. Particularly, these software instructions may be stored on one or more computer readable media or devices, such as, for example, the system memory 107, or an optical disk for use in the optical media device 119. As those of ordinary skill in the art will appreciate, software instructions stored in the manner described herein are inherently non-transitory in nature. More specifically, the software instructions are available for execution by the computer system 101, as opposed to being transmitted to the computer system via a carrier wave or some other transitory signal.

Figure 2:
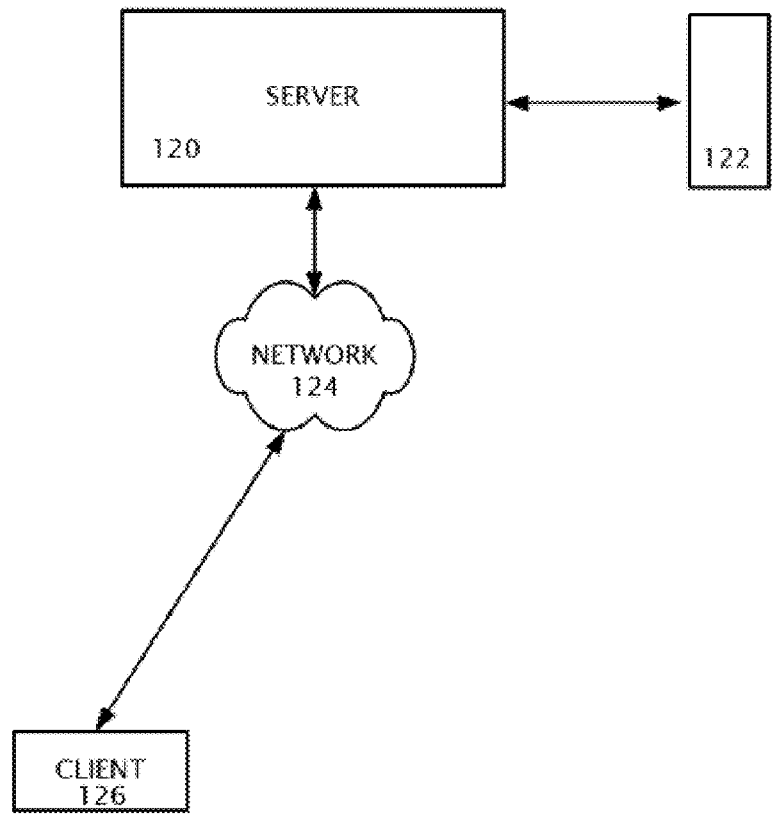
FIG. 2 is a schematic representation of a computer network.

FIG. 2 shows a simplified embodiment of an exemplary network that can achieve file transfers as described herein. A server computer 120 can have an associated storage device 122 (internal or external to the server computer). The server computer 120 can be coupled to a network, shown generally at 124, which can comprise, for example, a wide-area network, a local-area network, a client-server network, the Internet, or other such network. One or more client computer (e.g., a user's computing device), such as that shown at 126 can be coupled to the network 124 using a network protocol. When downloading a file from network 124, supplemental data can be delivered at the same time as the file being transferred from network 124 to user computer 126.

Figure 3:
FIG. 3 is a front view of a multimedia player.

Referring to FIG. 3, there is shown one embodiment of a multimedia player 200 configured as an automobile radio or stereo system. In some embodiments, the multimedia player 200 can comprise a screen 202, a download button 204, and an information button 206, in addition to the functionality found on conventional automobile stereo systems (e.g., tuner, volume, seek, etc.).

Figure 4:
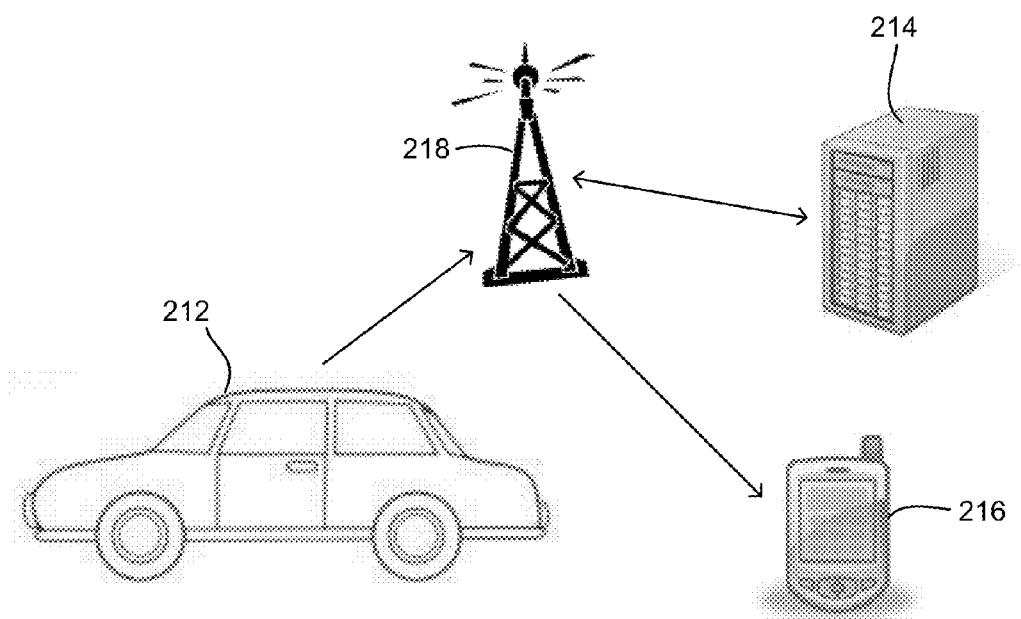
FIG. 4 is a schematic representation of a system for identifying and retrieving media content on demand.

Referring to FIGS. 3-4, the multimedia player 200 can be incorporated into an automobile, such as the automobile 212 of FIG. 2. The multimedia player 200 can be in communication with a media download service represented generally at 214. When a user hears a song on the radio that the user wishes to download, the user can press the download button 204 (see, e.g., FIG. 3). The multimedia player can then send a request to the media download service 214 to identify the song currently playing on the radio, and cause the song to be transmitted or downloaded to a designated receiving device 216, as shown in FIG. 4. The designated receiving device 216 can comprise, for example, a portable music player, mobile phone, tablet, computer, local memory on the multimedia player 200, or any combination thereof. The user can specify the designated receiving device(s) before or at the time of downloading the song, and the device can be configured to save the song for playback by the user. In some embodiments, the song can be transmitted over a wireless network 218, such as a cellphone network or a wireless local area network (LAN). In some embodiments, the multimedia player can be configured to interface with analog or digital content broadcast on the radio (e.g., AM radio, FM radio, etc.), content streamed over the Internet (e.g., Pandora® Internet Radio) or content made available by subscription music services (e.g., SiriusXM® satellite radio).

Figure 5:
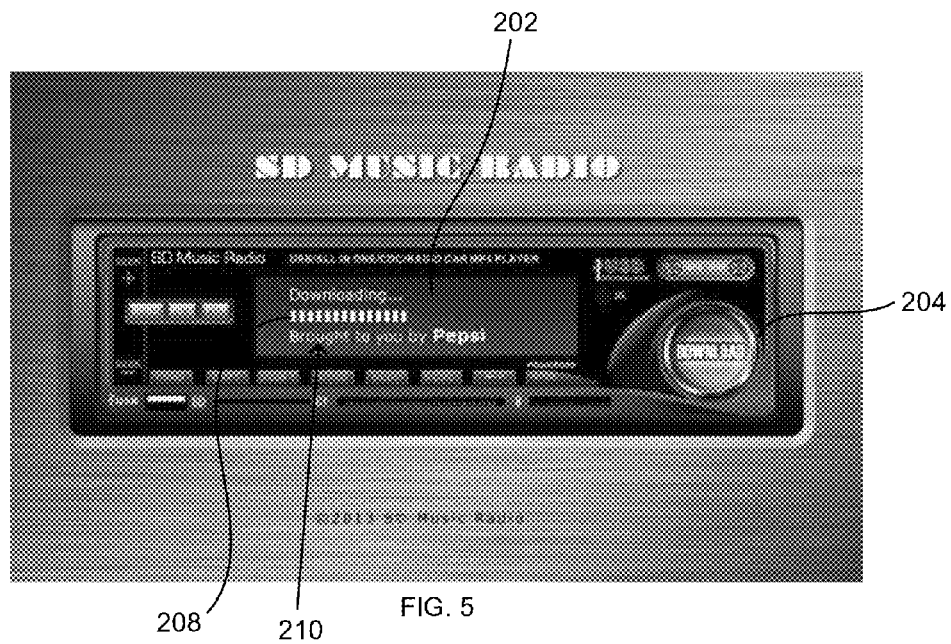
FIG. 5 is a front view of the multimedia player of FIG. 2 downloading a song.

The media download service can include software configured to identify the song currently being played on the radio. In some embodiments, the media download service can identify the song by audio fingerprinting, wherein audio data of the currently playing song is sampled by the multimedia player and transmitted to the media download service. The sampled audio data can be matched with audio files in the database of the media download service to ensure that the correct song is retrieved. The multimedia player can also be configured to transmit the text information (e.g., song title, artist name, etc.) provided over the air and typically displayed on the screens of automobile radio units to the media download service to ensure that the correct song is identified. Once the correct song is identified, the song can be made available for download over the wireless network. In some embodiments, the screen 202 can be configured to display a progress bar 208 so that the user can follow the progress of the download, as shown in FIG. 5.

In some embodiments, an advertisement can be combined with the song file before transmission to the user. In this manner, the user can receive the song file with the advertisement such that when the song file is played by the user, the advertisement is played as well. Each song, or each delivery of a song, can have one or more sponsors (i.e., sponsoring entities). The one or more sponsors can provide the advertisements that are combined with the song file before the song file is delivered to the user. Each time an advertisement is combined with a song and delivered in response to a request by a user, the originating sponsor of the advertisement can be charged a fee. In this manner, the fees charged to sponsors can be provided to publishers of the media content made available to users on the database.

In some embodiments, the advertisements can comprise audio advertisements and can be from about five seconds to about sixty seconds long. The advertisements can be configured to play the first time the song file is played by the user, every time the song is played by the user, or any other suitable number of times. In some embodiments, the length of the advertisement, number of advertisements combined with the song, and the number of times the advertisement plays after receipt of the song by the user can depend upon, for example, the popularity of the song (as measured by, e.g., the number of downloads, position of the song on one or more record charts, etc.), or the fee paid by the sponsor, etc. For example, in some embodiments, an advertisement combined with a song can play the first time that the user listens to the downloaded song and then never play again. In other embodiments, the advertisement can play a specified number of times (e.g., three times, five times, ten times, etc.) or every time the user plays the downloaded song.

In some embodiments, the media content providers can specify the fee to be paid by a sponsor for combining an advertisement with a particular song. In alternative embodiments, the sponsors can bid for the privilege of having their advertisement combined with a song in real time as requests for identification and download are received from users. In other embodiments, sponsors can specify an amount that they will pay for their advertisement to be combined with a song, and providers of media content can specify the amount that they wish to charge, and the media download service can match advertisements and song files for combination in accordance with the price parameters established by the sponsors and providers.

Figure 6:
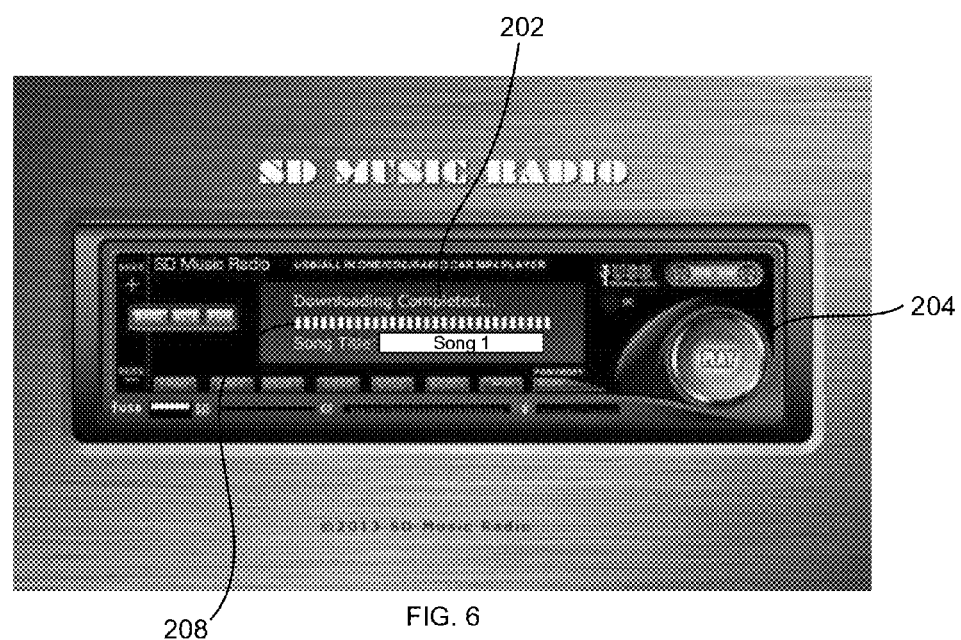
FIG. 6 is a front view of the multimedia player of FIG. 4 after finishing downloading the song.

In the embodiment shown in FIG. 5, the screen 202 of the multimedia player can also display textual advertising content 210 while the song file is being downloaded. For example, the textual advertising content can read "Brought to you by PEPSI®." In some embodiments, the textual advertising content and the advertisement embedded in the song file can originate with the same sponsor, or from different sponsors. In some embodiments, when the user elects to download the song file to local memory on the multimedia player and the file has finished downloading, the download button 204 can be configured to play the downloaded song file when pressed by the user, as shown in FIG. 6. It should be understood that the multimedia player and system disclosed herein can be implemented in any environment and on any device capable of receiving or presenting media content.

Figure 7:
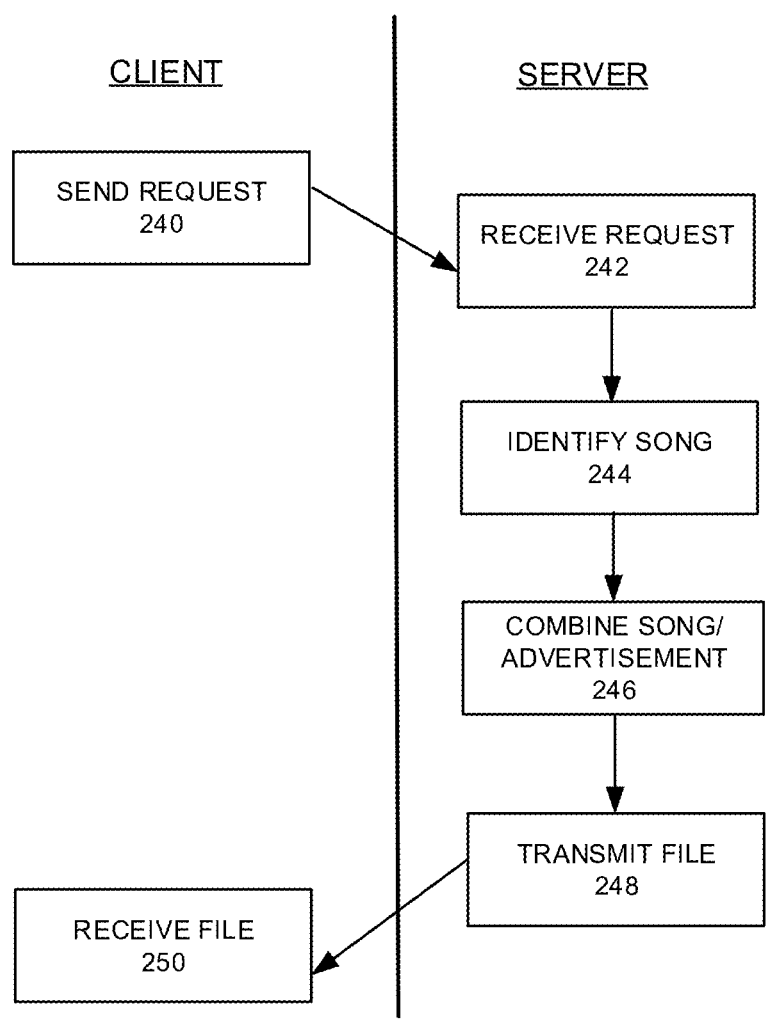
FIG. 7 is a block diagram illustrating how a computer network can be used to identify and retrieve media content on demand.

FIG. 7 shows an exemplary manner in which computer-executable instructions for performing any of the disclosed embodiments can be transmitted, accessed, or received using a remote server computer or a remote computing environment, such as the computing device 101. At process block 240, for example, the client multimedia player sends a request to identify and download media content currently being experienced by a user in the user's environment, such as a song playing on the radio, a movie being shown at a movie theater, or a television show playing on a television. The request can contain a data file comprising data, such as audio data, sampled from the media content. Alternatively, the request can contain textual information received by the multimedia player from, for example, a radio station or other broadcast entity, such as the title of a song and/or the name of an artist.

In process block 242, the request is received by the remote server or by respective components of the remote computing environment. In process block 244, the remote server or computing environment uses the data contained in the request to identify the media content currently being experienced by the user. In process block 246, the remote server or remote computing environment combines a media file containing the requested content with one or more advertisements, and transmits the combined media/advertisement file to the user in block 248. The combined media/advertisement file is received (e.g., stored, buffered, and/or executed) by the client multimedia player or another device designated by the user at block 250. In this manner, the user can instantly download, for example, a song heard on the radio over the computer network.

Figure 8:
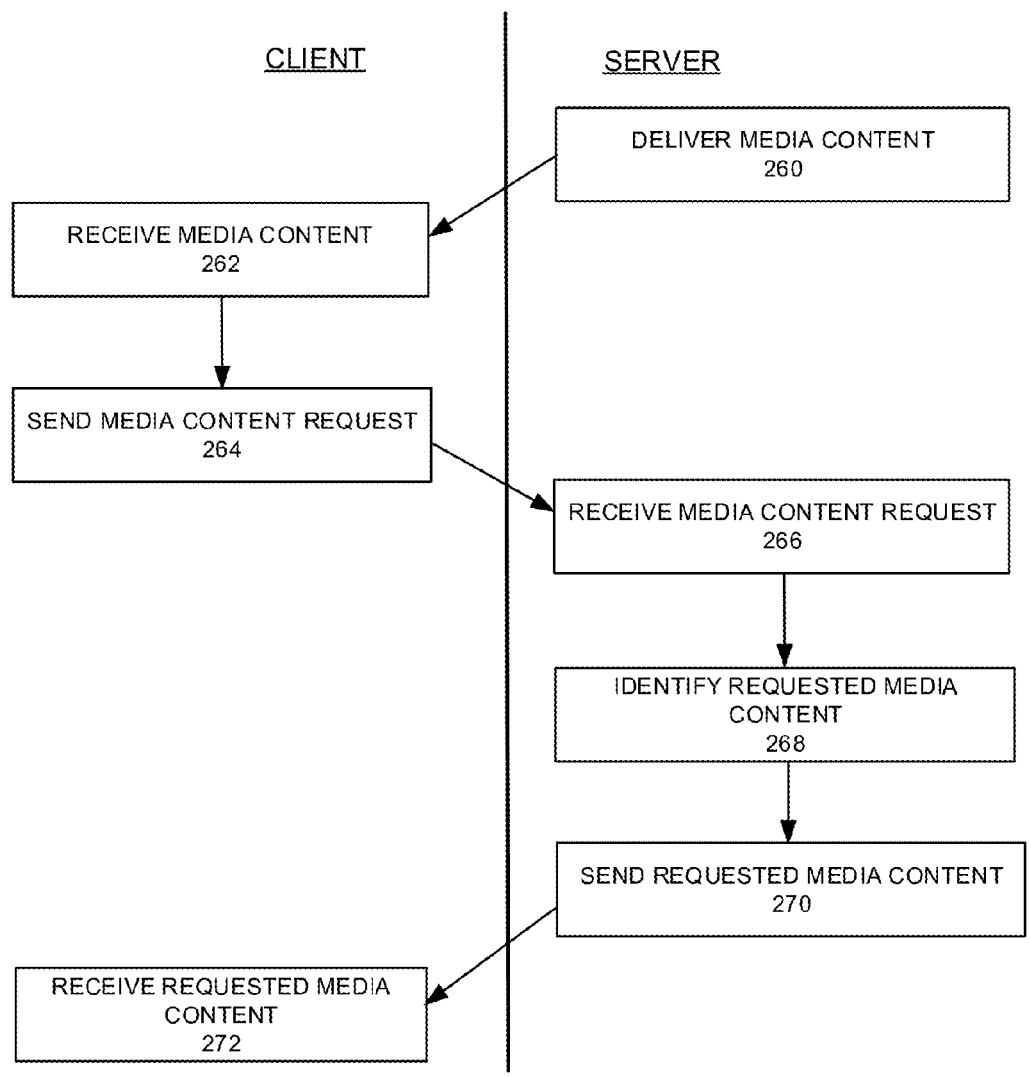
FIG. 8 is a block diagram illustrating another method by which a computer network can be used to identify and retrieve media content on demand.

FIG. 8 shows another exemplary manner in which computer-executable instructions for performing any of the disclosed embodiments can be transmitted, accessed, or received using a remote server computer or a remote computing environment. At process block 260, for example, the server delivers media content to the client multimedia player, such as a movie or a television show, over the Internet, which is received by the client multimedia player at process block 262 and experienced by a user. At block 264, the client multimedia player sends a request to identify and download at least a portion of the media content currently being experienced by the user, such as the movie or television show in its entirety, or a song incorporated into the movie or television show. The request to identify the media content is received by the server at block 266, and the server identifies the media content at block 268. The server then transmits or sends the requested media content to the user at block 270, and the requested media content is received by the client multimedia player at block 272.

Figure 9:
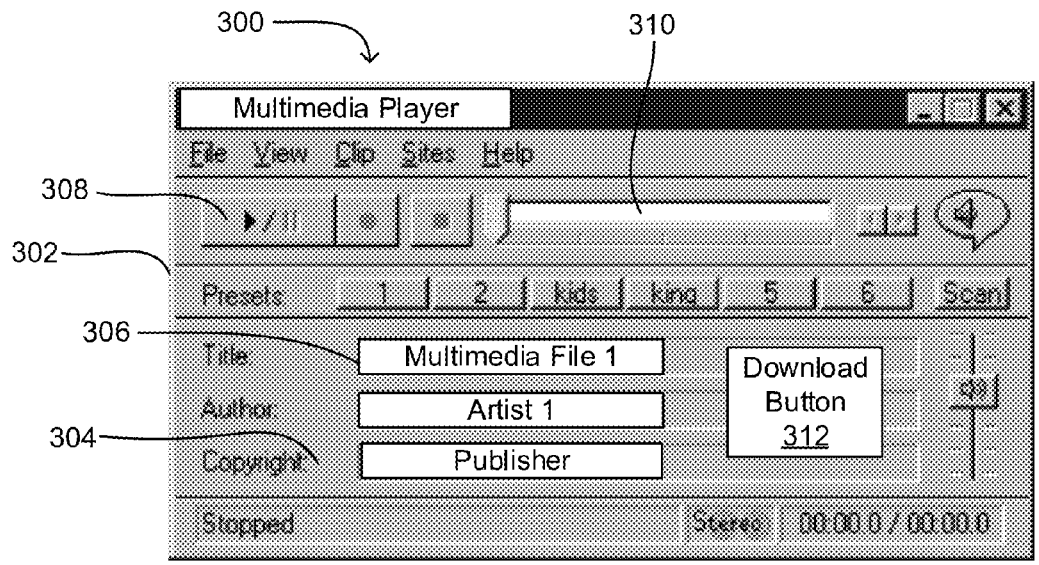
FIG. 9 is a front view of another embodiment of a multimedia player.

Referring to FIG. 9, there is shown another embodiment of a multimedia player 300 configured as a software application for use on a computing device, such as the computing device 101 described above. The multimedia player 300 can comprise a graphical user interface 302 for displaying content to a user, and a multimedia library 304 including one or more multimedia files 306. The one or more multimedia files 306 can include, for example, audio media such as individual songs or whole music albums, podcasts, etc., video media such as movies, or any other suitable type of multimedia file. The one or more multimedia files can be stored locally on memory located in the computing device 101, or stored remotely and accessed (i.e., streamed) by the multimedia player 300 over a network (e.g., the network 124 of FIG. 2). The multimedia player 300 can also comprise a play/pause button 308 and a progress bar 310. In some embodiments, the multimedia player 300 can be configured to run additional applications such as games, web browsers, etc.

Figure 10:
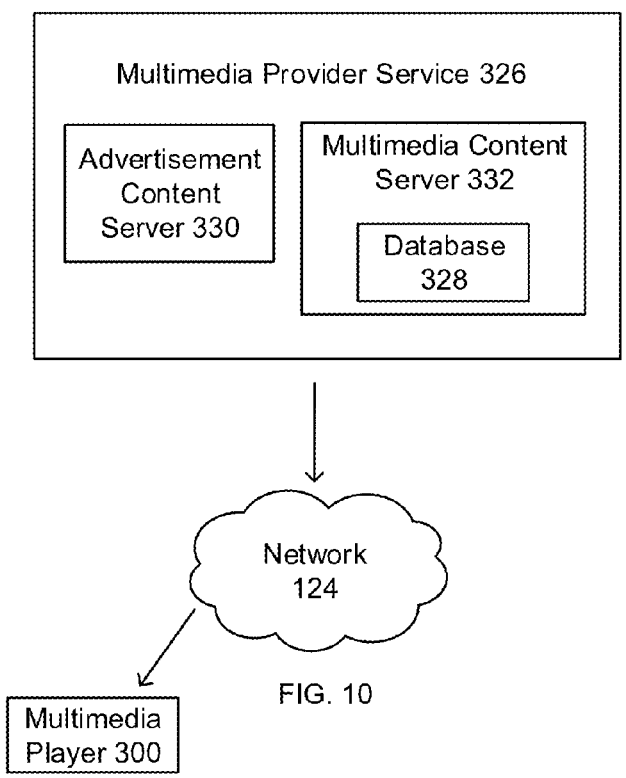
FIG. 10 is a schematic representation of a system for providing sponsored downloads of multimedia content to a user on-demand.

Referring to FIG. 10, the multimedia player 300 can be in communication, e.g., over network 124, with a multimedia provider service 326. The multimedia provider service 326 can have a multimedia content server 332 having a database 328 of multimedia files, such as music files, video files, etc., available for download to the multimedia player 300 by a user. The database 328 can be accessible remotely (e.g., over the network 124) from the multimedia player, and can display the multimedia files available on the database 328 on the graphical user interface 302 of the multimedia player. In particular embodiments, the database 328 of the multimedia content server 332 can be searchable by the user. The multimedia provider service 326 can also have an advertisement content server 330 having advertisements (i.e., commercial messages) provided by one or more sponsors (i.e., sponsoring entities). Sponsors can be download sponsors, streaming sponsors, banner sponsors, install sponsors, or any combination thereof. Sponsors can also be associated with other products such as photos, concert tickets, 3D Blueprints, bonus audio and video multimedia, etc. In this manner, the multimedia player 300 can store multimedia files locally for playback, can download multimedia files from the multimedia provider service for local playback on the multimedia player, or can stream multimedia files from the multimedia provider service (i.e., the multimedia files are played on the multimedia player 300 but not stored on the multimedia player).

Figures 11, 12:
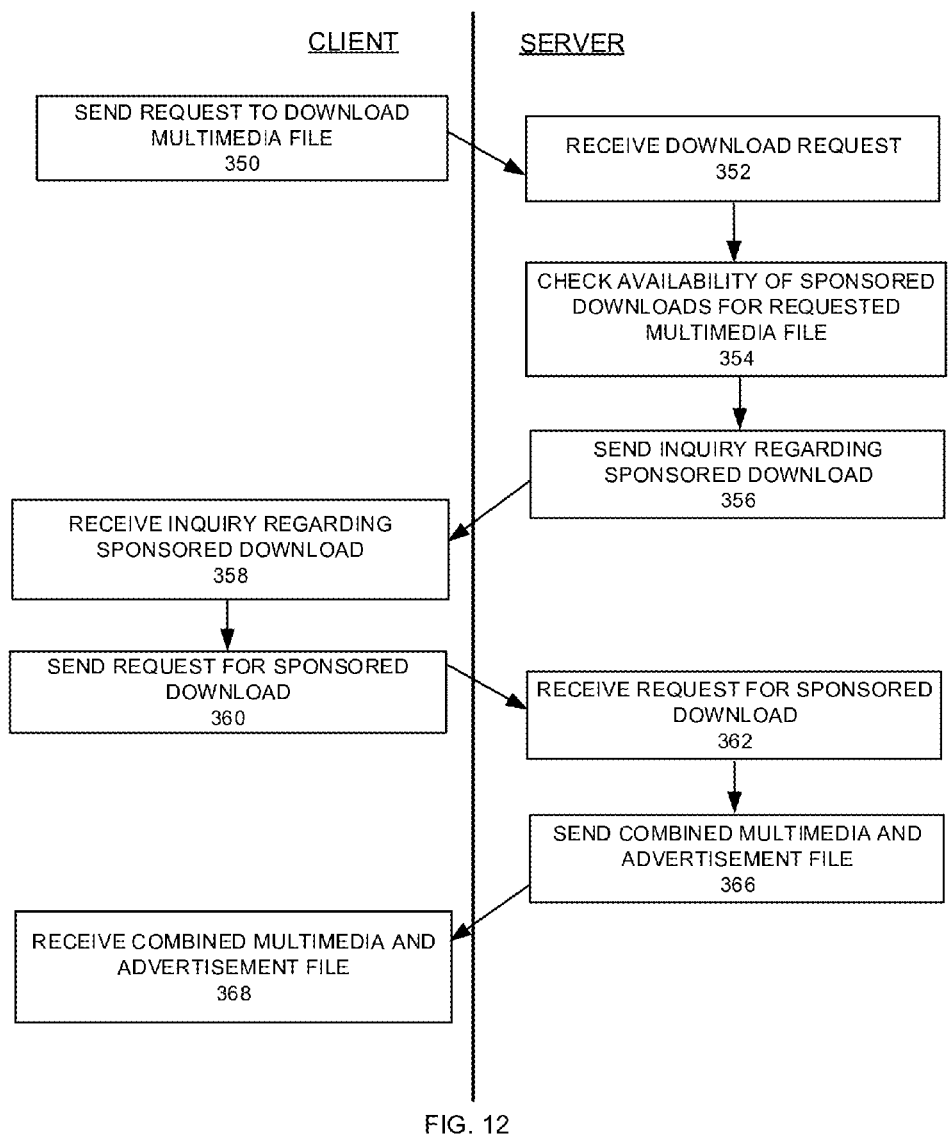
FIG. 11 is an exemplary embodiment of a multimedia provider service.
FIG. 12 is a block diagram illustrating a method by which a computer network can be used to provide a sponsored download of a multimedia file to a user.

In particular embodiments, the multimedia provider service can comprise one or more pending download request queues 342, as shown in FIG. 11. The pending download request queues 342 can be configured to track the number of pending download requests for one or more multimedia files. The multimedia provider service can also have one or more completed download counters 344 configured to track the number of download requests completed for one or more multimedia files. The data tracked by the queues 342 (i.e., the number of pending download requests for a multimedia file) and the download counters 344 (i.e., the number of completed downloads for a multimedia file) can be made available to the one or more sponsors. Additionally, the multimedia provider service 326 can include a counter 346 configured to track the total number of users currently registered with the multimedia provider service and/or the number of users currently logged in or otherwise in communication with the service 326 over the network.

In some embodiments, each multimedia file, or each download of a multimedia file, can have one or more sponsors, as described above with respect to the embodiment of FIGS. 3-8. When the multimedia provider service receives a request to download a multimedia file, the multimedia provider service can, for example, fulfill the download request by transmitting the requested multimedia file along with a commercial message provided by one or more sponsors. In some embodiments, the one or more sponsors can be charged a fee in exchange for having their commercial message provided with the download of the multimedia file. In some embodiments, the commercial message is an advertisement stored on the advertisement content server 330. In this manner, the fees charged to sponsors can be provided to publishers of the multimedia file, and the multimedia file can be provided to the user free of charge. In alternative embodiments, the multimedia player can be configured to allow users to download multimedia files free of charge and without associated advertisements.

In some embodiments, the multimedia provider service can be configured to allow one or more sponsors to sponsor a specified number (i.e., a block) of downloads of a particular multimedia file or files for a fee. For example, a sponsor may wish to sponsor a block of 10, 100, 1,000, 10,000, etc., downloads of a particular multimedia file by users. Alternatively, the block of downloads may not be associated with a particular multimedia file, but may instead be allocated toward a particular multimedia genre (e.g., music of a particular style or by a particular artist, films starring a particular actor, etc.). Sponsored downloads may also be directed to users having IP addresses associated with, e.g., a particular geographic location. Once a sponsor has sponsored a block of downloads, the number of remaining sponsored downloads can be tracked by the multimedia provider service using one or more remaining download counters 368 (FIG. 11).

For example, a sponsor wishing to provide 1,000 sponsored downloads of a multimedia file to users can pay a fee to the multimedia provider service corresponding to the specified number of downloads. The sponsor can also provide advertisement files corresponding to one or more advertising campaigns to the multimedia provider service, which advertisement files can be stored on the advertisement content server 330. When the multimedia provider service receives a request to download a multimedia file, the multimedia provider service can transmit the multimedia file to the user along with a commercial message (e.g., an advertisement). When the specified number of downloads have occurred, the multimedia provider service can notify the sponsor. The sponsor can then, for example, elect to sponsor additional downloads, or decline to sponsor additional downloads.

An exemplary implementation may proceed in the following manner, with reference to FIG. 12. When a user locates a multimedia file that they would like to download, the user can send a request to the multimedia provider service to download the multimedia file at process block 350. At process block 352, the download request can be received by the multimedia provider service and stored in a download request queue (such as queue 342) associated with the particular multimedia file. The multimedia provider service 326 can then check to see whether a sponsored download is available (i.e., whether one or more sponsors has sponsored a block of free downloads of the multimedia file) at process block 354. If a sponsored download is available, the multimedia provider service can send an inquiry to the user to choose whether they would like to initiate a sponsored download or a non-sponsored download at process block 356, which inquiry can be received by the user at process block 358. If the user elects to proceed with a sponsored download, the multimedia player can send a request for a sponsored download of the multimedia file at process block 360, which can be received by the multimedia provider service at process block 362. The multimedia provider service can transmit the multimedia file to the user with one or more commercial messages from the sponsor at process block 366, and the multimedia file and commercial messages can be received by the user at process block 368.

Returning to process block 374, if a sponsored download is not available, the download request can remain in the queue 342. In some embodiments, the one or more sponsors can monitor the queues 342 of multimedia files of interest in order to determine whether to sponsor additional downloads and/or how many additional downloads to sponsor. In other embodiments, the multimedia provider service can notify sponsors when unfulfilled requests for sponsored downloads are in the queues for one or more multimedia files, or when the remaining sponsored downloads counter 348 indicates that a sponsor's previously purchased block of sponsored downloads has or is about to run out. Notification can be, for example, by mobile messaging such as text, audio, or video messaging, email, telephone, etc. In this manner, the sponsors can determine the number of downloads of a particular multimedia file that they would like to sponsor based upon the number of pending download requests.

In some embodiments, one or more sponsors can bid against one another for the right to sponsor downloads of a particular multimedia file and/or a specified number of downloads for a particular multimedia file. For example, if a first sponsor bids to sponsor a block of 10,000 downloads of a multimedia file for, e.g., $10,000, and a second sponsor bids to sponsor the same block of 10,000 downloads for $15,000, the multimedia provider service can award the block of downloads to the second sponsor. In this manner, additional fees generated can be distributed to the creators and/or publishers of the multimedia content contained in the multimedia files, and sponsors can compete with one another to target advertising at demographics associated with the multimedia content.

In alternative embodiments, blocks of sponsored downloads can be allocated on a first-come first-served basis. For example, if a sponsor elects to sponsor 10,000 downloads of a multimedia file and, later in time, a second sponsor also elects to sponsor an additional 10,000 downloads of the same multimedia file, the multimedia provider service can provide 10,000 downloads sponsored by the first sponsor in response to the first 10,000 download requests and 10,000 downloads sponsored by the second sponsor in response to the next 10,000 download requests. Alternatively, upon depletion of the first sponsor's block of downloads, the first sponsor can be given the opportunity to purchase additional sponsored downloads before the second sponsor's block of downloads are made available.

In further alternative embodiments, sponsored download requests can be fulfilled from blocks of downloads provided by multiple sponsors at the same time. For example, if a first, a second, and a third sponsor each provide respective blocks of sponsored downloads, the mulimedia provider service can fulfill sponsored download requests from each sponsor's block of downloads. The allocation of sponsored download requests among the three sponsors' blocks of downloads can proceed, for example, proportionately, randomly, or according to some criterion including time of day, geographic location of a user's IP address, etc.

In some embodiments, a user can be given a choice regarding which sponsor they would prefer to have sponsor their download of a particular multimedia file. For example, upon receipt of a request for a sponsored download of a multimedia file, the multimedia provider service can respond with an inquiry informing the user of the sponsors from which sponsored downloads are currently available, and asking the user to select which sponsor the user would prefer to have sponsor their download. Upon receipt of the user's selection, the multimedia provider service can provide a download of the requested multimedia file to the user sponsored by the sponsor of the user's choice (i.e., accompanied by one or more commercial messages from that sponsor).

Returning to FIG. 9, the multimedia player 300 can include a download button 312. The download button 312 can be configured, for example, as an icon, dialogue box, or window that displays on the graphical user interface 302 while streaming a multimedia file from the multimedia provider service. Alternatively, the download button 312 can be a physical button located on the multimedia player. If the user wishes to download the multimedia file currently streaming to the multimedia player, the user can initiate a download of the multimedia file by activating the download button 312. The download of the requested multimedia file can then proceed in a manner similar to the process described with respect to FIG. 12 above. In alternative embodiments, the download button 312 can be configured to display in applications such as games or web browsers. For example, if a user elects to run a trial version of a game, the download button can be configured to display in the application, allowing the user to initiate a download of the game by activating the download button 312. The download button 312 can be by, for example, touching the button with a finger or stylus, pressing a physical button on the multimedia player 300, or by voice activation, to name a few.

In further alternative embodiments, the download button 312 need not be related to the software application currently running on the multimedia player. For example if a multimedia file is currently being played back on the multimedia player, the download button 312 can display offering a download of a game. Similarly, if the multimedia player is running a game or other application, the download button can be configured to display offering a download of a song or other multimedia file (e.g., a song associated with the game application). In other embodiments, the download button 312 can be configured as a download prompt or window, and can display on the graphical user interface in place of, for example, album art associated with a song currently being played on the multimedia player. The download button 312 can offer a download of, for example, the song currently playing (if the song is not already stored locally on the multimedia player), a game, etc. After displaying for a predetermined time (e.g., 30 seconds), the album art can be re-displayed on the graphical user interface, or the download button can be reconfigured to display, for example, an offer to download a different multimedia file, game, or other application.

Figure 16:
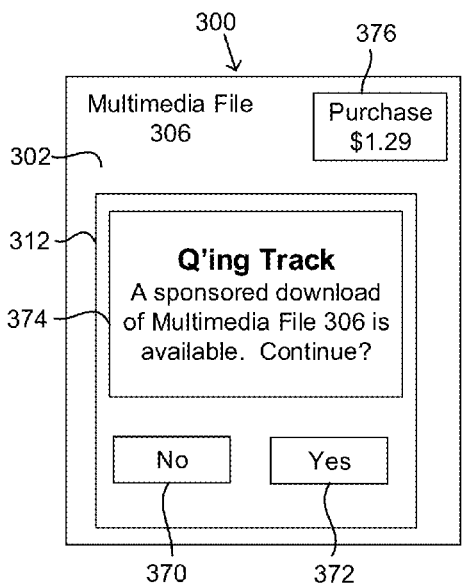
FIG. 16 is another view of the multimedia player of FIG. 9

In another embodiment, the download button 312 can be configured to display on the graphical user interface 302 when there is a sponsored download of a multimedia file 306 available, as shown in FIG. 16. The download button 312 can be configured to display in response to an action by a user, such as initiation of streaming playback of the multimedia file 306, or a search for the multimedia file. Alternatively, the download button 312 can be configured to display on the graphical user interface unprompted when, for example, a sponsored download of a multimedia file becomes available on the multimedia provider service. In the embodiment of FIG. 16, the download button 312 can include a dialogue box 374 informing the user that a sponsored download is available, a "yes" button 370, and a "no" button 372. Activation of the "yes" button 370 by a user can initiate a sponsored download of the multimedia file. Conversely, activation of the "no" button 372 by the user can decline the sponsored download. Alternatively, the download button 312 can be configured to display and inform the user if there is not a sponsored download of the multimedia file available.

Figure 17:
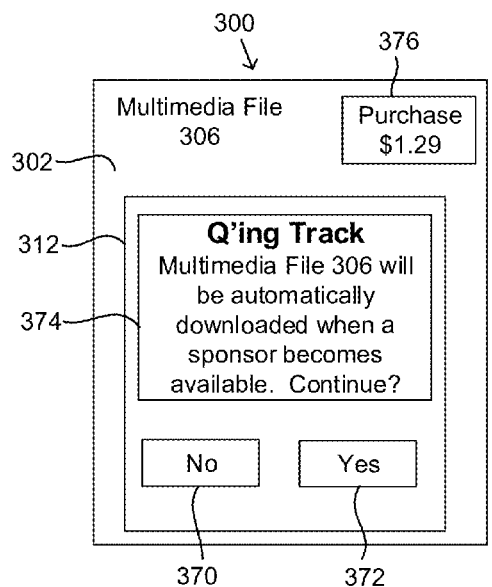
FIG. 17 is another view of the multimedia player of FIG. 9

Referring to FIG. 17, the download button 372 can be further configured to inquire whether the user would like to be added to a queue associated with a multimedia file 306, such as the queues 342 described above. For example, dialogue box 374 can display a message inquiring whether the user would like the multimedia player to automatically initiate a download of the multimedia file 306 when a sponsored download becomes available. Activation of the "yes" button 370 can initiate a sponsored download request, which can be stored in the queue 342 associated with the multimedia file 306. Activation of the "no" button can decline to initiate a request for a sponsored download. The addition of a user's sponsored download request to a queue 342 can be communicated to the one or more sponsors, as described above. Alternatively, the graphical user interface can display a purchase button 376 (FIGS. 16 and 17), whereby the user can pay a fee to download the multimedia file if they choose to decline a sponsored download or if a sponsored download is not available. In some embodiments, the download button 372 can be configured to prompt the user regarding the desired data quality (e.g., 128 kbps, 256 kbps, raw, etc.) of the multimedia file they wish to download.

In some embodiments, sponsors can maintain accounts with the multimedia provider service. The accounts can allow the sponsors to reach particular user demographics by focusing on, e.g., particular types and/or genres of multimedia (e.g., genres of music, movies, etc.), times of day when users are active online, users' location, etc. In some embodiments, sponsors can have access to information such as the number of users who have elected to receive new multimedia content from specific content providers or artists, along with other demographic information regarding those users such as age, gender, geographic location, etc. In this manner, sponsors can use such information to decide how many downloads to sponsor and/or how much to bid for a block of sponsored downloads.

Figures 13, 14:
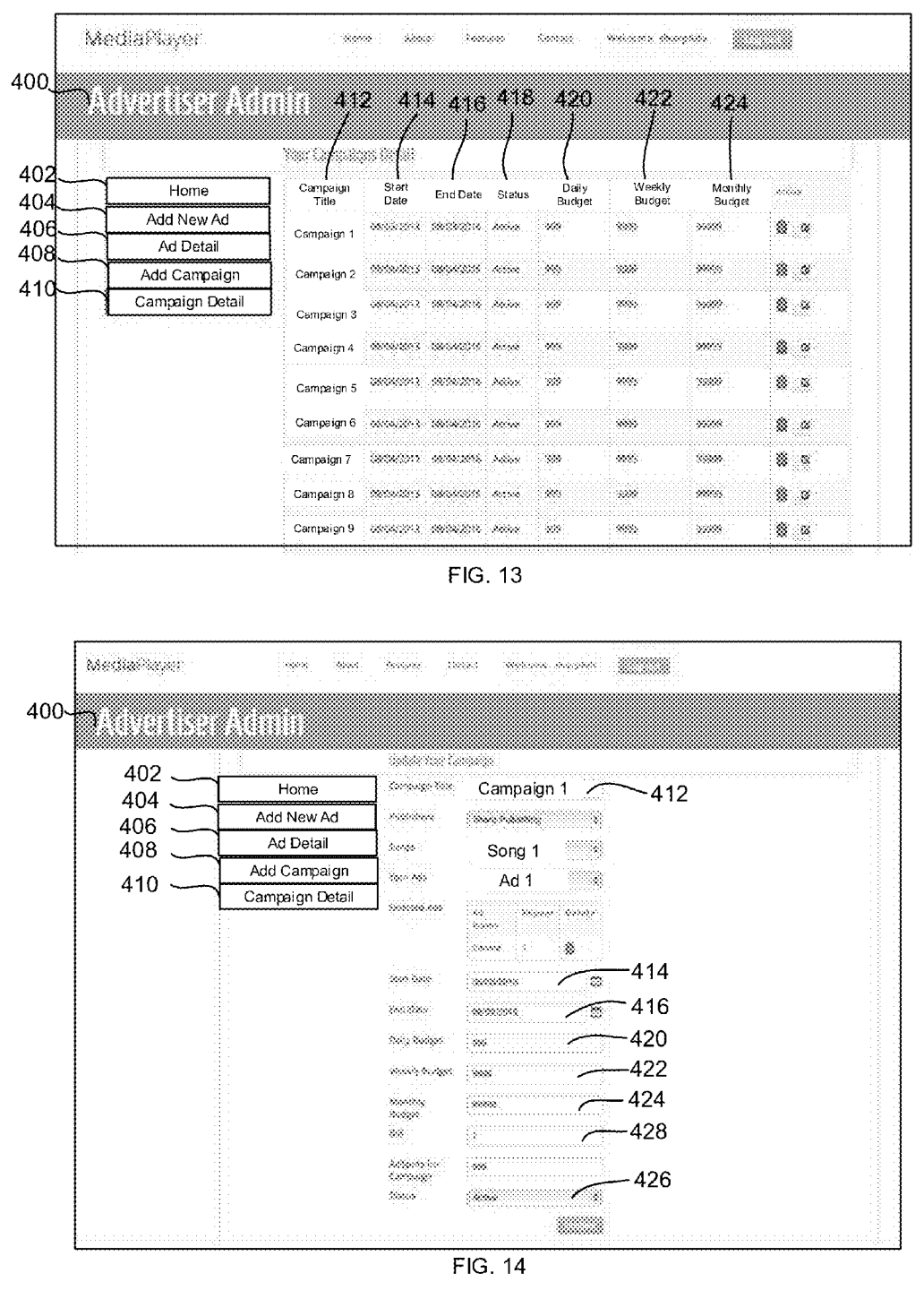
Figure 15:
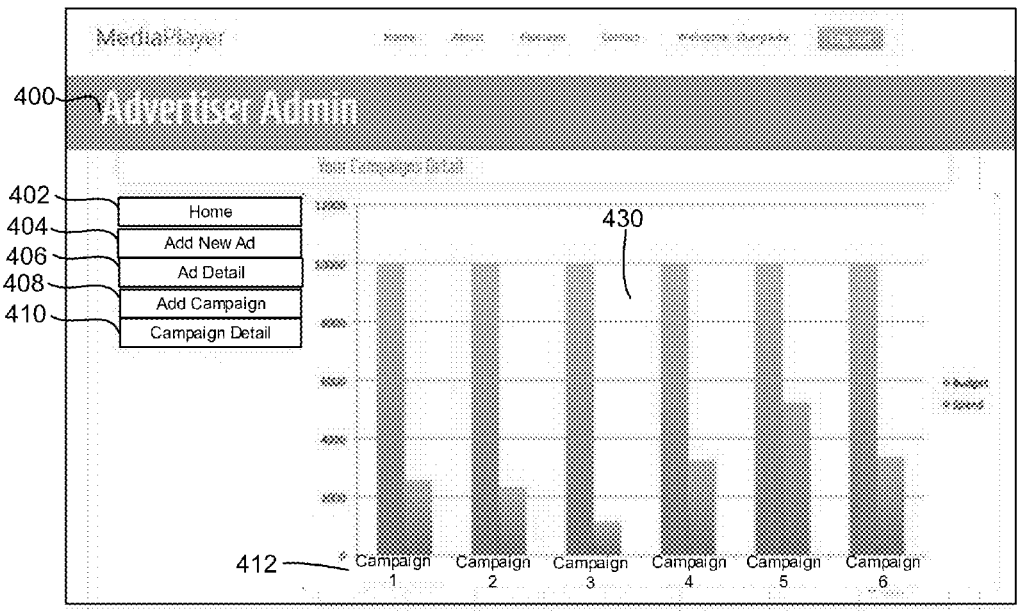
FIG. 15 is another view of the advertiser administrator page of the multimedia provider service.

As shown in FIGS. 13-15, the multimedia provider service can include an "Advertiser Admin" sponsor administrator (i.e., sponsor admin) 400. The sponsor administrator 400 can be configured as a web page accessible to sponsors (i.e., advertisers) through the multimedia provider service e.g., over the internet. The sponsor administrator 400 can be in place of or in addition to the functionality of the multimedia provider service described above with respect to FIG. 11. The sponsor administrator 400 can include a home tab 402, an add new advertisement tab 404, with which sponsors can add advertising content to advertisement content server 330, an ad detail tab 406, with which sponsors can add details about a particular advertisement or advertisement campaign, an advertisement campaign tab 408, with which sponsors can view all of their advertisement campaigns, and a campaign detail tab 410, with which sponsors can manage individual advertisement campaigns.

As shown in FIGS. 13 and 14, the sponsor admin 400 can allow sponsors to manage advertisement campaigns 412 by inputting a start date 414 and an end date 416, and by providing a status column 418 (FIG. 13) and a status change drop down menu 426 (FIG. 14), which can allow the sponsors to change particular advertisement campaigns 412 between active and non-active status. The sponsor admin 400 can also allow sponsors to manage parameters such as daily advertisement budgets 420, weekly advertisement budgets 422, and monthly advertisement budgets 424. Additionally, the sponsor admin can allow sponsors to track the number of bids the sponsor has made for blocks of sponsored downloads with bid counter 428. The campaign detail tab 410 can be configured to display a comparison of the sponsor's budget for a particular advertisement campaign 412 with the amount spent to date in the form of, for example, one or more bar charts 430, as shown in FIG. 15.

In some embodiments, the sponsor admin 400 can also be configured to display pricing information to sponsors, such as the prices being charged by publishers for downloads of multimedia files. In this manner, sponsors can make decisions about whether and how many downloads of a multimedia file to sponsor based upon the current price being charged by the publisher of the multimedia file. In some embodiments, the sponsor admin 400 can be configured to provide trend reports including data such as the number of pending sponsored download requests for the multimedia files having the highest number of pending sponsored download requests, or the number of pending sponsored download requests for particular multimedia files of the sponsor's choosing. Such reports can be produced, for example, hourly, daily, weekly, monthly, quarterly, or yearly.

Figure 18:
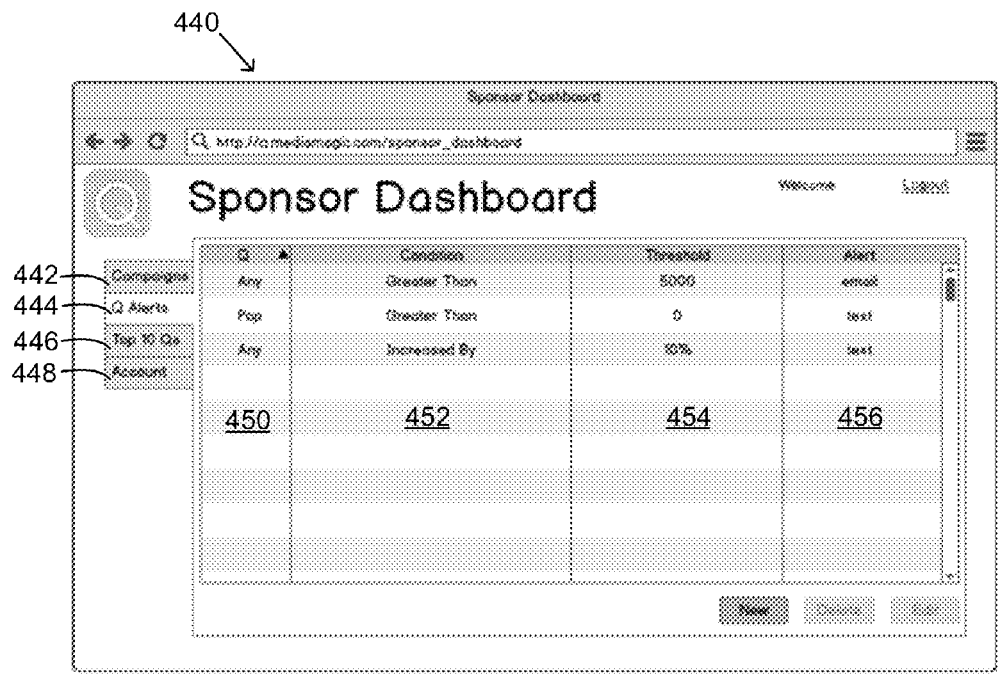
FIG. 18 illustrates an exemplary embodiment of a sponsor dashboard.

In some embodiments, the sponsor admin 400 can comprise a sponsor dashboard 440, as shown in FIG. 18. The sponsor dashboard 440 can be provided by the sponsor admin separately or in addition to the other features of the sponsor admin 400 described above. The sponsor dashboard can include a campaigns tab 442, an alerts tab 444, a top ten queues tab 446, and an account tab 448. The campaigns tab 442 can function in a manner similar to the advertisement campaign tab 408 and/or the campaign detail tab 410. The alerts tab 444 can be configured to allow a sponsor to input parameters concerning alerts they wish to receive regarding sponsored download request trends from the multimedia provider service 326. For example, the alerts tab 444 can comprise a customizable queue column 450, condition column 452, threshold column 454, and alert type column 456. The queue column 450 can be configured to allow a sponsor to select types of multimedia (e.g., music genres, particular multimedia files, etc.) for which they would like to receive alerts.

The condition column 452 can allow the sponsor to specify the type of condition for which they wish to receive an alert or notification. Exemplary conditions can include "greater than" and "increased by." The condition types of the condition column 452 can be related to the threshold, which can be set in the threshold column 454. For example, if a sponsor selects that they would like to receive an alert when the number of pending sponsored download requests for a multimedia file is greater than 5000, the sponsor can enter the number 5000 in the threshold column 454. Similarly, if a sponsor wishes to receive a notification when the number of sponsored download requests for a particular multimedia file increases by a specified percentage (e.g., ten percent), the sponsor can enter the specified percentage in the threshold column 454. The multimedia provider service can then send a notification to the sponsor when a specified condition has been met.

The type of alert or notification generated by the sponsor dashboard 440 can be specified in the alert type column 456, and can include email, text message, phone call, etc., or any combination thereof, as described above. The top ten queues tab 446 can be configured to display the ten multimedia files in the database 328 of the multimedia content server 332 which currently have the highest number of pending sponsored download requests. The top ten queues tab 446 can also display additional information, such as the sponsor's bid amount to sponsor a download for each of the multimedia files. In alternative embodiments, the top ten queues tab 446 can display the number of pending sponsored download requests for any suitable number of multimedia files. The accounts tab 448 can be configured to function similar to the home tab 402 of the sponsor admin 400.

Figure 19:
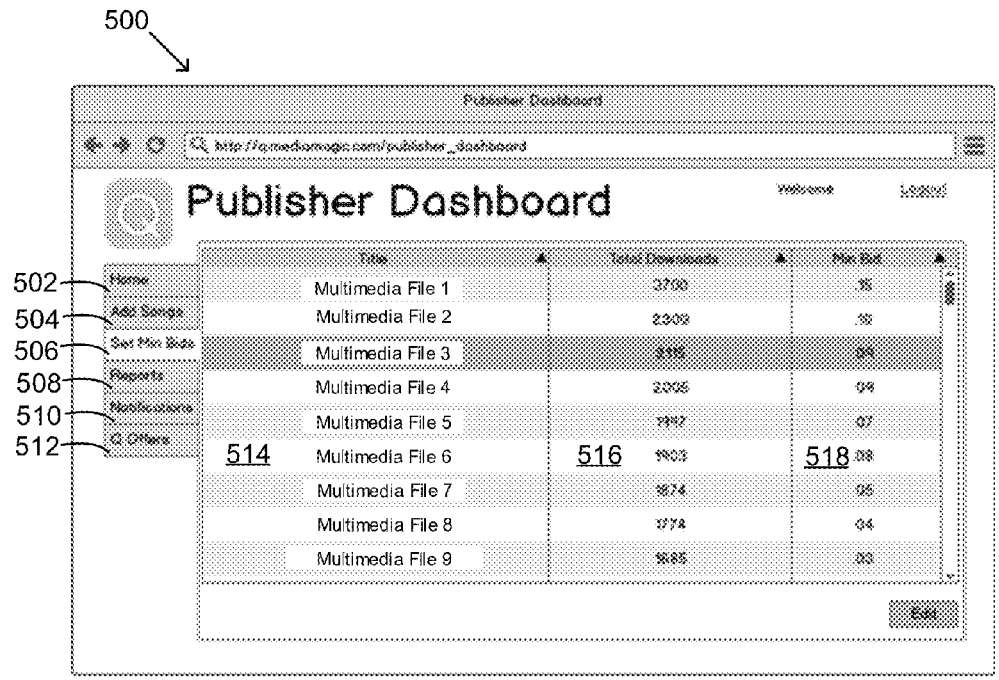
FIG. 19 illustrates an exemplary embodiment of a publisher dashboard.

In some embodiments, the multimedia provider service 326 can include a publisher dashboard 500, shown in FIG. 19. The publisher dashboard 500 can be configured to allow publishers of multimedia content to create and manage accounts with the multimedia provider service, and to interact with sponsors. The publisher dashboard can include a home tab 502, an add songs tab 504, a set minimum bid tab 506, a reports tab 508, a notifications tab 510, and a queue offers tab 512. The add songs tab 504 can be configured to allow a publisher to upload multimedia content to the multimedia content server 332. The set minimum bids tab 506 can have a multimedia file column 514 configured to display a list of multimedia files uploaded by the publisher, a total downloads column 516 configured to display the total number of downloads for each multimedia file listed in the multimedia file column 514, and a minimum bid column 518 configured to allow the publisher to specify the minimum amount that they wish to charge one or more sponsors to sponsor downloads of the multimedia files listed in the multimedia file column 514.

Figure 20:
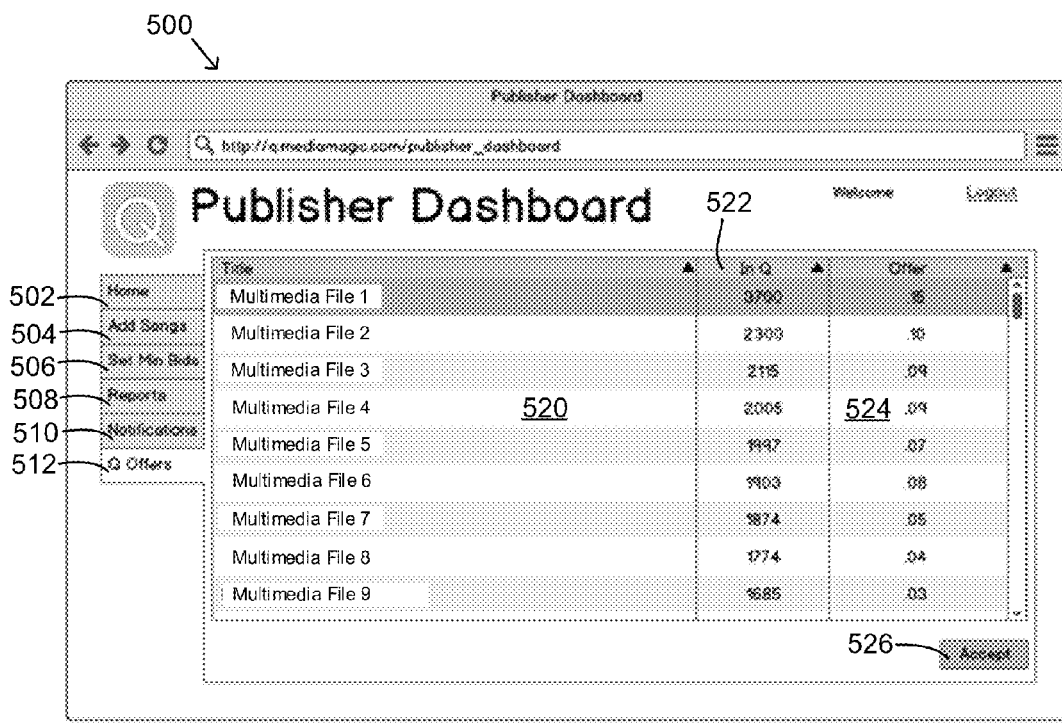
FIG. 20 illustrates another view of the publisher dashboard of FIG. 19.

The notifications tab 510 can be configured to allow a publisher to input parameters concerning how they wish to receive notifications from the multimedia provider service 326, similar to the alerts tab 444 of the sponsor dashboard 440. The queue offers tab 512 can have a multimedia file column 520 configured to display a list of multimedia files uploaded by the publisher, an in-queue column 522 configured to display the number of pending sponsored download requests for each multimedia file listed in the multimedia file column 520, and an offer column 524 configured to allow the publisher to view various bids or offers by one or more sponsors to sponsor the pending download requests, as shown in FIG. 20. The queue offers tab 512 can further include an accept button 526, activation of which indicates the publisher's acceptance of the one or more sponsors' bid or bids, and allows the pending sponsored download requests to be fulfilled, as described above.

Figure 21:
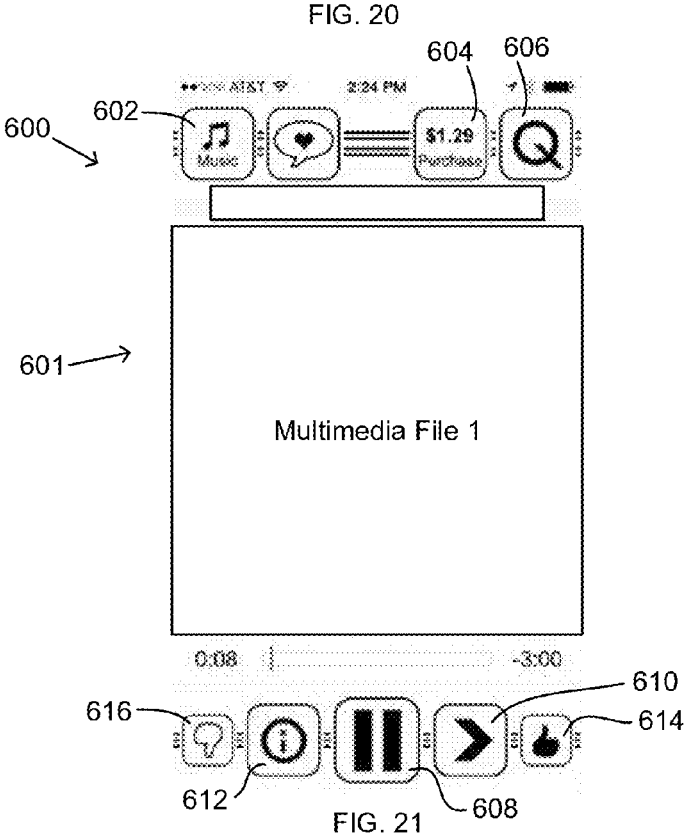
FIG. 21 illustrates another embodiment of a multimedia player.

FIG. 21 illustrates another embodiment of a multimedia player 600, similar to the multimedia player 300. The multimedia player 600 can comprise a graphical user interface 601, the graphical user interface 601 being configured to display a music button 602, a purchase button 604, a download button 606, play and skip buttons 608, 610, an information button 612, and like and dislike buttons 614, 616. The download button 606 can be configured to initiate a sponsored download request from the multimedia provider service 326, similar to the download button 312. The like and dislike buttons 614, 616 can be configured to allow a user to indicate a preference for a particular multimedia file or genre. In some embodiments, the multimedia player 600 can be configured to communicate the user's preferences to the multimedia download service 326 via the communication network 124.

Figure 22:
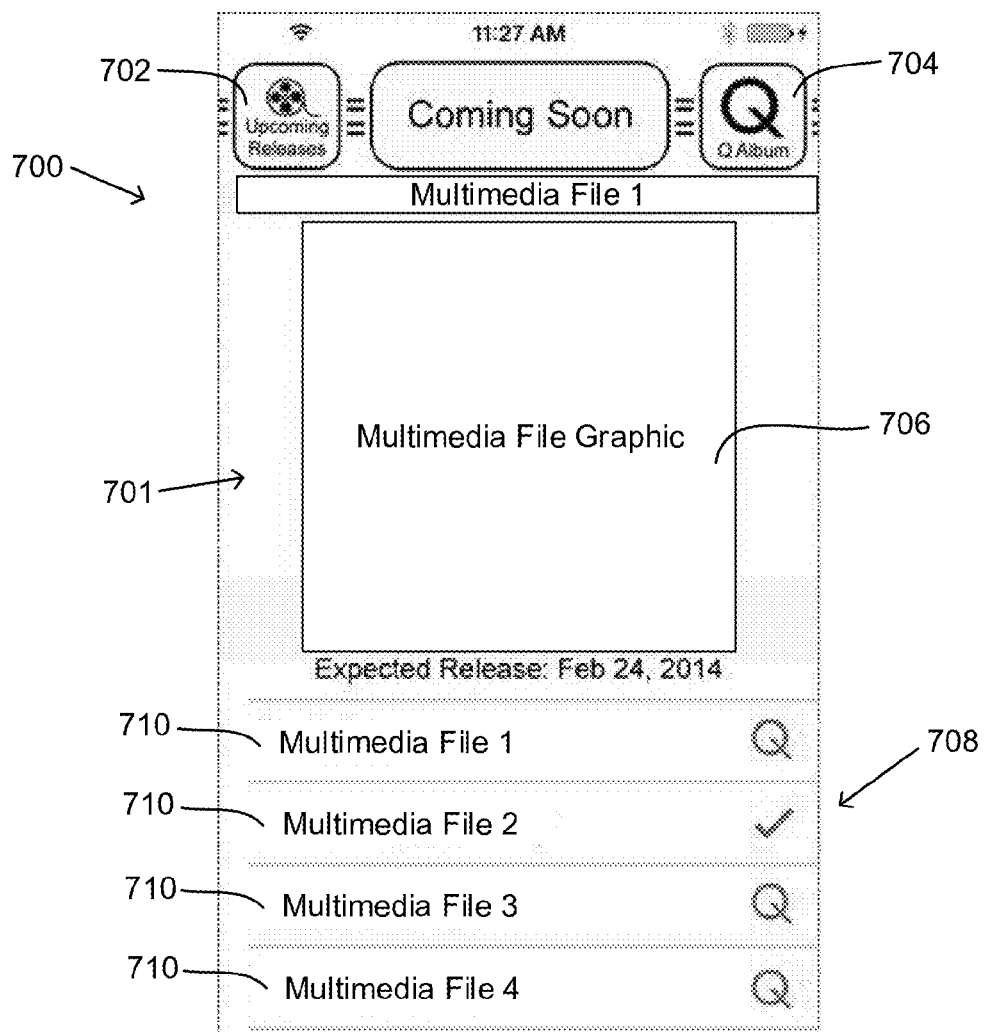
FIG. 22 illustrates another embodiment of a multimedia player.

FIG. 22 illustrates another embodiment of a multimedia player 700, similar to the multimedia player 300. The multimedia player 700 can comprise a graphical user interface 701, the graphical user interface 701 being configured to display an upcoming releases button 702 and a download button 704. The download button 704 can be configured to initiate a sponsored download request from the multimedia provider service 326, similar to the download button 312. The upcoming releases button 702 can be configured to display a list 708 of one or more multimedia files 710 that have not yet been published or released by the respective multimedia content providers. The list 708 can include multimedia file graphics 706, such as album art or cover art, text such as album titles, movie titles, and track listings, and the anticipated date of release of the multimedia files 710. In some embodiments, the multimedia player 700 can be configured such that when a user selects a particular multimedia file 710 (e.g., by clicking or touching the multimedia file graphic 706 or activating the download button 704), the multimedia player 700 can send a sponsored download request to the multimedia provider service 326. The sponsored download request can be automatically added to a pending download request queue 342 associated with the multimedia file 710. In this manner, when the multimedia file 710 is released by the respective content provider, the media provider service 326 can automatically initiate a sponsored download of the requested multimedia file 710 to the multimedia player 700.

Figure 23:
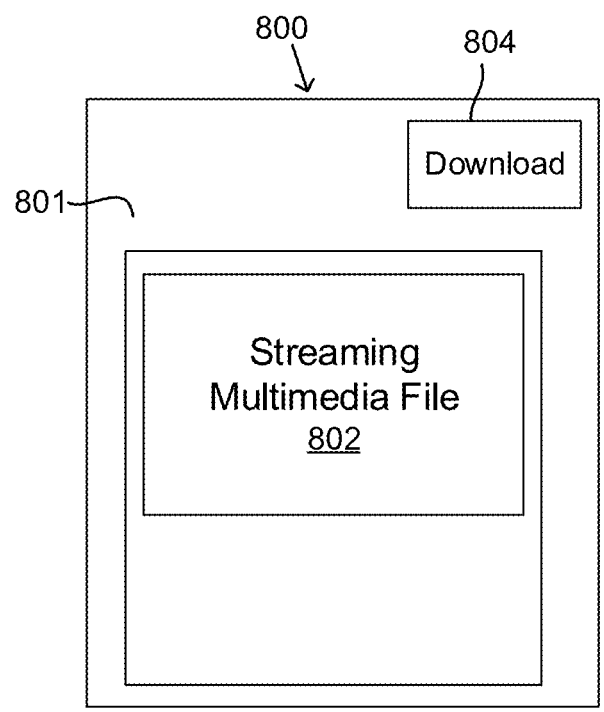
FIG. 23 illustrates another embodiment of a multimedia player.

FIG. 23 illustrates another embodiment of a multimedia player 800 comprising a graphical user interface 801. The graphical user interface 801 can be configured to display a title of a currently streaming multimedia file 802, and a download button 804. The streaming multimedia file 802 can be streaming from any multimedia streaming service (e.g., Spotify®, iRadio®, Google Play®, Pandora®, Beats®, etc.). The download button 804 can be configured to initiate a sponsored download request from the multimedia provider service 326, similar to the download button 312. More specifically, the download button 804 can be configured to identify the streaming multimedia file 802, and to initiate a sponsored download request from the multimedia provider service 326. Identification of the streaming multimedia file 802 can be accomplished by, for example, acoustic fingerprinting, or communicating directly with the streaming application on the multimedia player 800. Once the download button 804 is activated, the sponsored download request can proceed according to any of the embodiments described above.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. One or more non-transitory computer-readable media storing computer-executable instructions for causing a computer to perform a method of providing sponsored downloads of multimedia content to a device on-demand, the method comprising:
   over a network,
   receiving a request to sponsor one or more downloads of one or more multimedia files by one or more devices, the request originating from a sponsoring entity, the one or more multimedia files being available through a multimedia provider service;
   receiving a request to download a multimedia file from the multimedia provider service, the request originating from a multimedia player;
   transmitting the multimedia file to the multimedia player; wherein
   the multimedia file is transmitted to the multimedia player with a commercial message from the sponsoring entity,
   wherein the one or more downloads further comprise a predetermined number of downloads and each transmission of a multimedia file sponsored by the sponsoring entity results in a corresponding reduction in a number of remaining sponsored downloads,
   the multimedia provider service comprises one or more queues corresponding to the one or more multimedia files to store requests that exceed the number of remaining sponsored downloads, and
   the request to download a multimedia file is stored in the one or more queues corresponding to the multimedia file.

2. The method of claim 1, wherein the predetermined number of downloads sponsored by the sponsoring entity corresponds to a fee paid by the sponsoring entity to the multimedia provider service.

3. The method of claim 1, wherein the one or more queues store one or more pending download requests, and the number of pending download requests can be made available to the sponsoring entity.

4. The method of claim 1, wherein the multimedia provider service allows a second sponsoring entity to bid against the first sponsoring entity for the right to sponsor downloads of the one or more multimedia files.

5. The method of claim 1, wherein:
   the multimedia provider service is configured to stream the one or more multimedia files to the multimedia player; and
   the multimedia player comprises a download button configured to display while the multimedia file is being streamed to the multimedia player.

6. The method of claim 5, wherein the multimedia provider service is configured to transmit a copy of the multimedia file to the multimedia player in response to a download request sent by the multimedia player upon activation of the download button by a user, the multimedia file being stored locally on the multimedia player.

7. The method of claim 1, wherein the commercial message is displayed to the device on a graphical user interface of the multimedia player.

8. The method of claim 1, wherein the commercial message is played back on the multimedia player when the multimedia file is played back.

9. The method of claim 1, wherein the sponsoring entity comprises one or more sponsoring entities, and the multimedia provider service is configured to allow for the selection of the sponsoring entity.

10. The method of claim 1, wherein the multimedia provider service is configured to allow the sponsoring entity to manage one or more advertisement campaigns, the one or more advertisement campaigns having one or more commercial messages associated therewith.

* * * * *